US008241526B2

(12) United States Patent
Hsu

(10) Patent No.: US 8,241,526 B2

(45) Date of Patent: Aug. 14, 2012

(54) AQUEOUS DISPERSIONS OF ELECTRICALLY CONDUCTING POLYMERS CONTAINING HIGH BOILING SOLVENT AND ADDITIVES

(75) Inventor: Che-Hsiung Hsu, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 264 days.

(21) Appl. No.: 12/121,121

(22) Filed: May 15, 2008

(65) Prior Publication Data

US 2009/0114884 A1 May 7, 2009

Related U.S. Application Data

(60) Provisional application No. 60/938,786, filed on May 18, 2007.

(51) Int. Cl.
*H01B 1/04* (2006.01)
*H01B 1/12* (2006.01)
*B32B 27/28* (2006.01)

(52) U.S. Cl. .......... 252/511; 252/510; 977/932; 257/40; 428/419; 428/411.1

(58) Field of Classification Search .................. 252/511, 252/510; 977/932; 257/40; 428/419, 411.1
See application file for complete search history.

(56) References Cited

U.S. PATENT DOCUMENTS 3,282,875 A 11/1966 James
4,358,545 A 11/1982 Ezzell et al.
4,433,082 A 2/1984 Grot
4,552,927 A 11/1985 Warren
4,731,408 A 3/1988 Jasne
4,795,543 A 1/1989 Stetter
4,869,979 A 9/1989 Ohtani et al.
4,940,525 A 7/1990 Ezzell
4,959,430 A 9/1990 Jonas et al.
5,002,700 A 3/1991 Otagawa et al.
5,069,820 A 12/1991 Jen et al.
5,160,457 A 11/1992 Elsenbaumer
5,185,100 A 2/1993 Han et al.
5,247,190 A 9/1993 Friend et al.
5,286,413 A 2/1994 Hannecart
5,300,575 A 4/1994 Jonas
5,317,169 A 5/1994 Nakano et al.
5,378,402 A 1/1995 Cross et al.
5,463,005 A 10/1995 Desmarteau
5,537,000 A 7/1996 Alivisatos et al.
5,705,888 A 1/1998 Staring et al.
5,798,170 A 8/1998 Zhang et al.
5,863,465 A 1/1999 Kinlen
5,917,279 A 6/1999 Elschner et al.
5,986,400 A 11/1999 Staring et al.
5,994,496 A 11/1999 Van Haare et al.
6,097,147 A * 8/2000 Baldo et al. ................... 313/506
6,150,426 A 11/2000 Curtin
6,210,790 B1 4/2001 Crivello
6,303,238 B1 10/2001 Thompson et al. ........... 428/690
6,303,943 B1 * 10/2001 Yu et al. .......................... 257/40
6,319,428 B1 11/2001 Michot et al.
6,324,091 B1 11/2001 Gryko et al.
6,337,370 B1 1/2002 Bae et al.
6,358,437 B1 3/2002 Jonas
6,515,314 B1 2/2003 Duggal et al.
6,593,690 B1 7/2003 McCormick et al.
6,632,472 B2 10/2003 Louwet
6,670,645 B2 12/2003 Grushin et al. ................. 257/98
6,706,963 B2 3/2004 Gaudiana et al.
6,717,358 B1 4/2004 Liao et al.
6,756,474 B2 6/2004 Hsu
6,830,828 B2 * 12/2004 Thompson et al. ........... 428/690
6,875,523 B2 * 4/2005 Grushin et al. ............... 428/690
6,923,881 B2 8/2005 Tateishi et al.
6,924,047 B2 * 8/2005 Radu et al. .................... 428/690
6,963,005 B2 * 11/2005 Lecloux et al. ................. 556/22
7,112,369 B2 9/2006 Wang et al.
7,166,010 B2 1/2007 Lamansky et al.
7,189,771 B2 3/2007 Hsu
7,211,824 B2 * 5/2007 Lazarev .......................... 257/40
7,244,797 B2 7/2007 Kurihara
7,250,461 B2 7/2007 Hsu et al.
7,307,276 B2 * 12/2007 Andriessen ..................... 257/40
7,317,047 B2 * 1/2008 Hsu .............................. 524/165
7,338,620 B2 * 3/2008 Hsu et al. ...................... 252/500
7,354,532 B2 4/2008 Hsu et al.
7,371,336 B2 5/2008 Hsu et al.
7,390,438 B2 6/2008 Hsu et al.

(Continued)

FOREIGN PATENT DOCUMENTS

CN 1439029 A 8/2003
DE 4334390 A1 4/1995
EP 560721 A2 9/1993
EP 0440957 B1 3/1996
EP 488321 A1 10/1997
EP 817540 A2 1/1998
EP 593111 A1 6/1998
EP 0962943 B1 12/1999
EP 1231251 A1 8/2002
EP 1286569 A1 2/2003
EP 1371709 A1 12/2003
EP 1026152 B1 7/2006
EP 1408563 A3 10/2006
EP 1726051 A1 11/2006
EP 1191614 B1 6/2009

(Continued)

OTHER PUBLICATIONS

Baytron P VAP A1 4083 and Baytron P VP CH 8000 Product Information for Electronic Grades Designed for Use as Hole-Injection Material in OLEDS, obtained from www.HCSTARCKECHEMICALS.com, No date.*

(Continued)

*Primary Examiner* — Douglas McGinty

(57) ABSTRACT

The present invention relates to electrically conductive polymer compositions, and their use in electronic devices. The compositions are an aqueous dispersion of at least one electrically conductive polymer doped with a non-fluorinated polymeric acid, at least one high-boiling polar organic solvent, and an additive selected from the group consisting of fullerenes, carbon nanotubes, and combinations thereof.

14 Claims, 1 Drawing Sheet

U.S. PATENT DOCUMENTS

| | | | | |
|---|---|---|---|---|
| 7,431,866 | B2 | 10/2008 | Hsu et al. | |
| 7,455,793 | B2 | 11/2008 | Hsu et al. | |
| 7,462,298 | B2 | 12/2008 | Hsu et al. | |
| 7,569,158 | B2 | 8/2009 | Waller et al. | |
| 7,593,004 | B2 * | 9/2009 | Spath et al. | 345/174 |
| 7,727,421 | B2 * | 6/2010 | Hsu et al. | 252/500 |
| 7,749,407 | B2 * | 7/2010 | Hsu et al. | 252/511 |
| 7,837,901 | B2 * | 11/2010 | Hsu et al. | 252/500 |
| 2001/0019782 | A1 | 9/2001 | Igarashi et al. | |
| 2001/0038937 | A1 | 11/2001 | Suzuki et al. | |
| 2002/0009680 | A1 | 1/2002 | Majumdar et al. | |
| 2002/0017612 | A1 * | 2/2002 | Yu et al. | 250/370.11 |
| 2002/0038999 | A1 | 4/2002 | Cao | |
| 2002/0041151 | A1 | 4/2002 | Park | |
| 2002/0098377 | A1 | 7/2002 | Cao et al. | |
| 2002/0099119 | A1 | 7/2002 | Craig et al. | |
| 2002/0127381 | A1 | 9/2002 | Will et al. | |
| 2002/0190250 | A1 * | 12/2002 | Grushin et al. | 257/40 |
| 2002/0192476 | A1 | 12/2002 | Kambe et al. | |
| 2003/0020073 | A1 | 1/2003 | Long et al. | |
| 2003/0108771 | A1 * | 6/2003 | Lecloux et al. | 428/690 |
| 2003/0118829 | A1 | 6/2003 | Hsu | |
| 2003/0213952 | A1 | 11/2003 | Iechi et al. | |
| 2004/0009346 | A1 | 1/2004 | Jang et al. | |
| 2004/0036067 | A1 * | 2/2004 | Andriessen | 257/40 |
| 2004/0072987 | A1 | 4/2004 | Groenendaal et al. | |
| 2004/0092700 | A1 | 5/2004 | Hsu | |
| 2004/0102577 | A1 * | 5/2004 | Hsu et al. | 525/182 |
| 2004/0124504 | A1 * | 7/2004 | Hsu | 257/655 |
| 2004/0127637 | A1 | 7/2004 | Hsu et al. | |
| 2004/0149952 | A1 | 8/2004 | DePenning et al. | |
| 2004/0149962 | A1 | 8/2004 | Andriessen | |
| 2004/0206942 | A1 * | 10/2004 | Hsu | 252/500 |
| 2004/0217877 | A1 | 11/2004 | Kokonaski et al. | |
| 2004/0222413 | A1 * | 11/2004 | Hsu et al. | 257/40 |
| 2004/0254297 | A1 * | 12/2004 | Hsu et al. | 525/54.2 |
| 2004/0262599 | A1 | 12/2004 | Bernds | |
| 2005/0070654 | A1 * | 3/2005 | Hsu | 524/430 |
| 2005/0089679 | A1 | 4/2005 | Ittel et al. | |
| 2005/0124784 | A1 * | 6/2005 | Sotzing | 528/380 |
| 2005/0184287 | A1 | 8/2005 | Herron et al. | |
| 2005/0205860 | A1 | 9/2005 | Hsu et al. | |
| 2005/0208328 | A1 * | 9/2005 | Hsu et al. | 428/690 |
| 2005/0209388 | A1 | 9/2005 | Hsu et al. | |
| 2005/0209392 | A1 | 9/2005 | Luo et al. | |
| 2005/0222333 | A1 | 10/2005 | Hsu | |
| 2005/0224765 | A1 | 10/2005 | Hsu et al. | |
| 2005/0224788 | A1 | 10/2005 | Hsu et al. | |
| 2006/0051401 | A1 | 3/2006 | Manohar | |
| 2006/0076050 | A1 * | 4/2006 | Williams et al. | 136/263 |
| 2006/0076557 | A1 * | 4/2006 | Waller et al. | 257/40 |
| 2006/0076577 | A1 | 4/2006 | Boos et al. | |
| 2006/0113510 | A1 | 6/2006 | Luo et al. | |
| 2006/0180810 | A1 | 8/2006 | Lee et al. | |
| 2006/0274049 | A1 * | 12/2006 | Spath et al. | 345/173 |
| 2006/0289843 | A1 | 12/2006 | Hsu et al. | |
| 2006/0292362 | A1 * | 12/2006 | Hsu et al. | 428/323 |
| 2007/0045591 | A1 | 3/2007 | Hsu et al. | |
| 2007/0069184 | A1 | 3/2007 | Hsu et al. | |
| 2007/0096082 | A1 | 5/2007 | Gaynor et al. | |
| 2008/0128662 | A1 | 6/2008 | Hsu et al. | |
| 2008/0135809 | A1 * | 6/2008 | Hsu | 252/500 |
| 2008/0213594 | A1 | 9/2008 | Hsu | |
| 2008/0248314 | A1 | 10/2008 | Hsu et al. | |
| 2008/0251768 | A1 | 10/2008 | Hsu et al. | |
| 2008/0258605 | A1 | 10/2008 | Yukinobu | |
| 2008/0283800 | A1 * | 11/2008 | Hsu | 252/511 |
| 2008/0296536 | A1 | 12/2008 | Hsu et al. | |
| 2009/0008609 | A1 | 1/2009 | Yeisley et al. | |
| 2009/0072201 | A1 | 3/2009 | Hsu et al. | |
| 2009/0114884 | A1 | 5/2009 | Hsu | |
| 2009/0154059 | A1 * | 6/2009 | Wessling et al. | 361/502 |

FOREIGN PATENT DOCUMENTS

| | | | |
|---|---|---|---|
| EP | 1191612 | B1 | 9/2009 |
| FR | 2632979 | A1 | 12/1989 |
| GB | 2124635 | A | 2/1984 |
| JP | 62119237 | A | 5/1987 |
| JP | 01038808 | B | 8/1989 |
| JP | 02249221 | A | 10/1990 |
| JP | 04234453 | A | 8/1992 |
| JP | 09176310 | A | 7/1997 |
| JP | 11353934 | A | 12/1999 |
| JP | 2000505249 | A | 4/2000 |
| JP | 2001006878 | A | 1/2001 |
| JP | 2001270999 | A | 10/2001 |
| JP | 2001325831 | A | 11/2001 |
| JP | 2002500408 | A | 1/2002 |
| JP | 2002082082 | A | 3/2002 |
| JP | 2002246177 | A | 8/2002 |
| JP | 2003187983 | A | 7/2003 |
| JP | 2003217862 | A | 7/2003 |
| JP | 2003264083 | A | 9/2003 |
| JP | 2003279582 | A | 10/2003 |
| JP | 2003297582 | A | 10/2003 |
| JP | 2004500449 | T | 1/2004 |
| JP | 2004502004 | T | 1/2004 |
| JP | 2004082395 | A | 3/2004 |
| JP | 2005537348 | A | 12/2005 |
| JP | 2006108064 | A | 4/2006 |
| JP | 2006527277 | T | 11/2006 |
| JP | 2007502531 | A | 2/2007 |
| JP | 2007529607 | A | 10/2007 |
| TW | 200304238 | | 9/2003 |
| WO | 98/31716 | A1 | 7/1998 |
| WO | 99/34371 | A1 | 7/1999 |
| WO | 99/52954 | A1 | 10/1999 |
| WO | WO 00/70655 | A2 | 11/2000 |
| WO | 01/38219 | A1 | 5/2001 |
| WO | 0141230 | A1 | 6/2001 |
| WO | WO 01/41512 | A1 | 6/2001 |
| WO | 01/99207 | A2 | 12/2001 |
| WO | 02/02714 | A2 | 1/2002 |
| WO | 0200759 | A1 | 1/2002 |
| WO | 02/15645 | A1 | 2/2002 |
| WO | 02/99907 | A1 | 5/2002 |
| WO | 02065484 | A1 | 8/2002 |
| WO | 03/006537 | A1 | 1/2003 |
| WO | 03006515 | A1 | 1/2003 |
| WO | WO 03/008424 | A1 | 1/2003 |
| WO | 03/012908 | A2 | 2/2003 |
| WO | WO 03/040257 | A1 | 5/2003 |
| WO | 03/050824 | A1 | 6/2003 |
| WO | 03046540 | A1 | 6/2003 |
| WO | WO 03/063555 | A1 | 7/2003 |
| WO | 03074601 | A2 | 9/2003 |
| WO | WO 03/091688 | A2 | 11/2003 |
| WO | WO 2004/016710 | A1 | 2/2004 |
| WO | 2004020444 | A1 | 3/2004 |
| WO | 2004020502 | A1 | 3/2004 |
| WO | 2004/029176 | A1 | 4/2004 |
| WO | 2004029128 | A2 | 4/2004 |
| WO | 2004029133 | A1 | 4/2004 |
| WO | 2004/094501 | A2 | 11/2004 |
| WO | 2004094501 | A2 | 11/2004 |
| WO | 2004/105150 | A1 | 12/2004 |
| WO | 2005003083 | A1 | 1/2005 |
| WO | 2005018012 | A1 | 2/2005 |
| WO | 2005024853 | A1 | 3/2005 |
| WO | 2005041217 | A1 | 5/2005 |
| WO | 2005/052027 | A1 | 6/2005 |
| WO | 2005/090435 | A1 | 9/2005 |
| WO | 2005080525 | A2 | 9/2005 |
| WO | 2005090436 | A1 | 9/2005 |
| WO | 2005/093872 | A1 | 10/2005 |
| WO | 2005121217 | A1 | 12/2005 |
| WO | 2006/078264 | A2 | 7/2006 |
| WO | 2006073968 | A2 | 7/2006 |
| WO | 2007002681 | A2 | 1/2007 |
| WO | 2007002740 | A2 | 1/2007 |
| WO | 2007092296 | A2 | 8/2007 |
| WO | 2007/120143 | A1 | 10/2007 |

OTHER PUBLICATIONS

CRC Handbook of Chemistry and Physics, $81^{st}$ ed., 2000 (book not included).
Lee et al., Poly(thieno[3,4-b]thiophene): A New Stable Low Band Gap Conducting Polymer, *Macromolecules* [2001] 34: 5746-5747.
Sotzing et al., Poly(thieno[3,4-b]thiophene): A p- and n-Dopable Polythiophene Exhibiting High Optical Transparency in the Semiconducting State, *Macromolecules* [2002] 35: 7281-7286.
Y Wang, Photoconductive Polymers, Kirk-Othmer Encyclopedia of Chemical Technology, $4^{th}$ ed. 1996, 18: 837-860.
Appleby et al.,—Polymeric Perfluoro Bis-Sulfonimides As Possible Fuel Cells Electrolytes, J. Electrochem. Soc., 1993 vol. 140 pp. 109-111.
Baytron H. C. Stark Gmbh (Brochure) No Date.
Desmarteau, Novel Perfluorinated Ionomers and Ionenes, J. Fluorine Chem., 1995 vol. 72 pp. 203-208.
Feiring et al.—Aromatic Monomers With Pendant Fluoroalkysolfonate and Sulfonimide Groups, J Fluorine Chemistry, 2000 vol. 105 pp. 129-135.
Feiring et al.—Novel Aromatic Polymers With Pendant Lithium Perfluoroalkylsulfonate or Sulfonimide Groups, Macromolecules 2000 vol. 33 pp. 9262-9271.
Gustafsson et al.—Flexible Light-Emitting Diodes Made From Soluble Conducting Polymers, 1992 vol. 357 pp. 477-479.
Iijima et al.—Single-Shell Carbon Nanotubes of 1-nm Diameter 1993 vol. 363 pp. 603-605.
Ivanov et al., The Study of Carbon Nanotubules Produced by Catalytic Method, Chem. Phys. Lett. 1994, vol. 223 pp. 329-335.
Journet et al.,—Large-Scale Production of Single-Walled Carbon Nanotubes by the Electric-Arc Technique, Nature, 1997 vol. 388 pp. 756-758.
Li et al.—Large-Scale Synthesis of Aligned Carbon Nanotubes, Science, 1996 vol. 274 pp. 1701-1703.
Riedel et al., Tailored Highly Transparent Composite Hole-Injection Layer Consisting of Petot: PSS and SiO2 Nanoparticles for Efficient Polymer Light-Emitting Diodes, Advanced Materials, 2011 vol. 23 p. 740-745.
Thess et al., Crystalline Ropes of Metallic Carbon Nanotubes, Science, 1996 vol. 273 pp. 483-487.
Wu et al, Transparent, Conductive Carbon Nanotube Files, Science, 2004, Vol. 305, pp. 1273-1276 PCT International Search Report for International Application No. PCT/US06/25129; Elizabeth Robinson Authorized.
PCT International Search Report for International Application No. PCT/US06/25129; Elizabeth Robinson Authorized Officer Feb. 6, 2008.
PCT International Search Report for International Application No. PCT/US06/25136; Randy P. Gulakowski Authorized Officer Feb. 29, 2008.
PCT International Search Report for International Application No. PCT/US08/070718; Benedikt Schlicke Authorized Officer Oct. 31, 2008.
PCT International Search Report for International Application No. PCT/US09/35079; Lee W. Young Authorized Officer Officer Apr. 9, 2009.
PCT International Search Report for International Application No. PCT/US08/88089; Lee W. Young Authorized Officer Feb. 18, 2009.
PCT International Search Report for International Application No. PCT/US2010/032175; Rahn Kim Authorized Officer Dec. 20, 2010.
PCT International Search Report for International Application No. PCT/US2010/031836; Rahn Kim Authorized Officer Dec. 17, 2010.
Arnautov et al., New Dopant-Solvent System for Conductive PAN Films Production, Synthetic Metals, 1997, vol. 84, No. 1-3, pp. 133-134, Elsevier Science S.A.
Baytron Coating Guide Issue Oct. 2002—Obtained From www.hcstarck-wchemicals.com.
Baytron Product info from baytron.com; Aug. 1, 2007.
Brown et al, "Built-in field electroabsorbtion spectroscopy of plymer light-emitting diodes incorporating a doped poly (3,4-ethylene dioxythiophene) hole injection layer," Applied Physics Letters, AIP, American Institute of Physics, vol. 75, No. 12, Sep. 20, 1999, pp. 1679-1681.
Cen et al., 1,1,2,2-Tetrafluoro-2-(polyfluoroalkoxy)ethanesulfonic Acids, 1,1,2,2-Tetrafluoro-2-(perfluoroalkoxy) ethanesulfonic Acids, and 2,2'-Oxybis(1,1,2,2-tetrafluoroethanesulfonic acid), Inorganic Chemistry, 1988, vol. 27, pp. 1376-1377, American Chemical Society.
Colvin et al—Light-Emitting Diodes Made From Cadmium Selenide Nanocrystals and a Semiconducting Polymer, Nature, 1994, vol. 370 pp. 354-357.
Conductive Polymer Definition From Wikipedia, The Free Encyclopedia.
Database CA [Online] Chemical Abstracts Service, Columbus, Oh, US; Jan. 9, 1988, Iwata, Kaoru et.al: "Dopants for electrically conductive polymers" XP002335513 retrieved from STN Database accession No. 1988:7040 abstract.
Database CA [Online] Chemical Abstracts Service, Columbus, Ohio, US; Takei, Masashi et al: Metal colloid solution, electric conductor ink, electric conductor coating, and undercoating film for forming electric conductor coating layer, retrieved from STN Database accession No. 2001:847689.
Database CA [Online] Chemical Abstracts Service, Columbus, Ohio, US; Wakita, Katsuya et al: "High performance odor sensors and mthod for their manufacture," retrieved from STN Database accession No. 2002:219874.
Database CA [Online] Chemical Abstracts Service, Morimoto, Takeshi et al: "Solid Electrolytic Capacitor having Electrically Conductive Plymer on Dielectric Oxide Film"Database Accession No. 1991:113460, American Chemical Society, Columbus, OH, Oct. 5, 1990.
Downs C et al: "Efficient Polymerizaton of Aniline at Carbon Nanotube Electrodes", Advanced Materials, vol. 11, No. 12, Jan. 1, 1999, pp. 1028-1031.
Fowler J D et al: "Hydrogen detection by Polyanilline nanofibers on gold and platinum electrodes", The Journal of Physical Chemistry C, vol. 113, No. 16, Sep. 4, 2001, pp. 6444-6449.
Hirai et al; "Electrochemical Behaviors of Polypyrrole, Poly-3-Methyl-thiophene, and Polyaniline Deposited on Nafion-Coated Electrodes,"Journal of the Electrochemical Society, vol. 135, No. 5, May 1, 1988, pp. 1132-1137, Electrochemical Society, Manchester, NH.
Hsu, C.-H., Novel Preparation and Properties of Conductive Polyaniline/Nafion® Film, Synthetic Metals, 1991, 671-674, 41-43, Elsevier Sequoia, The Netherlands.
Kim et al, Enhancement of Electrical Conductivity of Poly(3,4-ethylenedioxythiophene)/Poly(4-styrenesulfonate) by a Change of Solvents, Synthetic Metals, Elsevier Sequoia, vol. 126, No. 2/3, pp. 311-316, Feb. 2002.
Kitani et al; "Properties of Elastic Polyaniline," Synthetic Metals, vol. 84, No. 1-3, 1997, pp. 83-84, Elsevier Science S. A.
Levi et al—Polymer and Cathode Emission Studies of Polymer-Based Light-Emitting Diodes.Under Strong Electrial Pulse Excitation, Journal of Applied Physics, 2000 vol. 88 No. 5 pp. 2548-2552.
Lim et al—Degradation of Organic Light-Emitting Devices Due to Formation and Growth of Dark Spots, Materials Science and Engineering 2001, pp. 154-159.
Madler et al—Visibly Transparent and Radiopaque Inorganic Organic Composites From.Flange-Made Mixed-Oxide Fillers. Journal of Nanoparticle Research, vol. 8, No. 3-4, 2005, p. 323-333.
Römpp Chemistry Dictionary, 9th Edition, 1993.
Schroedner et al—Organische Feldeffekttransistoren Auf Basis Halbleitender Polymere/.Organic Field-Effect Transistors Based on Semiconducting Polymers. Elektrotechnik Und Informationstechnik, Springer Verlag. 2003 vol. 120 No. 6, pp. 205-209.
Sharpe et al—Improved Cationic Conductive Polymer, Calgon Corp, Coating Conference (Proceeding) 1981 pp. 83-87.
Simpson et al.—Advances and Applications of Inherently Conductive Polymer Technologies Based on Poly(3,4-Ethylenedioxythiophene) 2005 AIMCAL Fall Technical Conference.
Thelakkat et al—Poly(Triarylamine)S-Synthesis and Application in Electroluminescent Devices and Photovoltaics, Synthetic Metals, 1999, vol. 102 pp. 1125-1128.

Yang S-M et al: "The photoelectrochemical properties of TiO2 electrodes modified by quantum sized PbS and.thiols", Synthetic Metals, vol. 123, No. 2, Sep. 4, 2001, pp. 267-272.
Yuan Y F et al: "Size and morphology effects of ZnO anode nanomaterials for Zn/Ni secondary batteries; Size and morphology effects of ZnO anode nanomaterials for Zn/Ni secondary batteries", Nanotechnology, vol. 16, No. 6, Jun. 1, 2005, pp. 803-808.
EESR 20110517; Extended European Search Report for Application No. EP 10 01 1570; May 17, 2011.
EESR 20110621; Extended European Search Report for Application No. EP 06 774 171; Jun. 21, 2011.
Extended European Search Report for Application No. EP 06785724.3, May 25, 2011.
Extended European Search Report for Application No. EP 10005557.3, Dec. 1, 2010.
ISR 20040217; PCT International Search Report for PCT/US2003/030509; C. Meiners Authorized Officer; Feb. 17, 2004.
ISR 20050630; PCT International Search Report for PCT/US2005/008561; G. Wolfbauer Authorized Officer; Jun. 30, 2005.
Partial European Search Report for Applicatin No. 10005557.3; Jul. 5, 2010.
Schwendeman et al; Periluoroalkanoate-substituted Pedot for Electronic Device Applications, Advanced Functional Materials, vol. 13, No. 7, 2003, pp. 541-547.
Opposition Against EP 1726051 [UC0673EPEPT1], Opposition Document from Herzog Fiesser & Partner; Heraeus Precious Metals GmbH; Sep. 15, 2011 [English Translation] .
Opposition Against EP 1726051 [UC0673EPEPT1], Opposition Document from Herzog Fiesser & Partner; Heraeus Precious Metals GmbH; Sep. 15, 2011 [German] .
Aleshin et al., "Transport Properties of Poly(3,4-ethylenedioxythiophene)/poly(styrenesulfonate)," Synthetic Metals, 1998, vol. 94, pp. 173-177.
Bharathan et al., "Polymer/metal Interfaces and the Performance of Polymer Light-Emitting Diodes," Journal of Applied Physics, 1998, vol. 84(6), pp. 3207-3211.
Huang et al., "Well-Dispersed Single-Walled Carbon Nanotube/Polyaniline Composite Films," Carbon, vol. 41, 2003, pp. 2731-2736.
Stejskal et al., "Polyaniline Dispersions 10. Coloured Microparticles of Variable Density Prepared Using Stabilizer Mixtures," Colloid Polymer Science, vol. 278, 2000, pp. 654-658.
Tang et al., "Organic/Inorganic Material for Coating on Metals," Materials Research Society Symp. Proc., vol. 734, 2003, pp. B.9.57.1-7.
Extended European Search Report for Application No. 08866235.8, counterpart to U.S. Appl. No. 12/809,895; Mar. 19, 2012.
Opposition Against EP 1726051, Opposition Document from Herzog Fiesser & Partner; Heraeus Precious Metals GmbH; Sep. 15, 2011 [German] .
Opposition Against EP 1726051, Opposition Document from Herzog Fiesser & Partner; Heraeus Precious Metals GmbH; Sep. 15, 2011 [English Translation] .
Opposition Against EP 1720651; Observations of the Patentee; May 31, 2011.
Opposition Against EP 1720651; Annex to Observations of the Patentee: Experimental Data (E6); May 31, 2012.
Opposition Against EP 1720651; Main Request—Claims; May 31, 2012.
Opposition Against EP 1720651; First Auxiliary Request—Claims; May 31, 2012.
Opposition Against EP 1720651; Second Auxiliary Request—Claims; May 31, 2012.
Opposition Against EP 1720651; Third Auxiliary Request—Claims; May 31, 2012.
Opposition Against EP 1720651; Fourth Auxiliary Request—Claims; May 31, 2012.
Opposition Against EP 1720651; Fifth Auxiliary Request—Claims; May 31, 2012.
Opposition Against EP 1720651; Sixth Auxiliary Request—Claims; May 31, 2012.
Opposition Against EP 1720651; Seventh Auxiliary Request—Claims; May 31, 2012.
Opposition Against EP 1720651; Eighth Auxiliary Request—Claims; May 31, 2012.
Opposition Against EP 1720651; Ninth Auxiliary Request—Claims; May 31, 2012.
Opposition Against EP 1720651; Tenth Auxiliary Request—Claims; May 31, 2012.
Opposition Against EP 1720651; Eleventh Auxiliary Request—Claims; May 31, 2012.

* cited by examiner

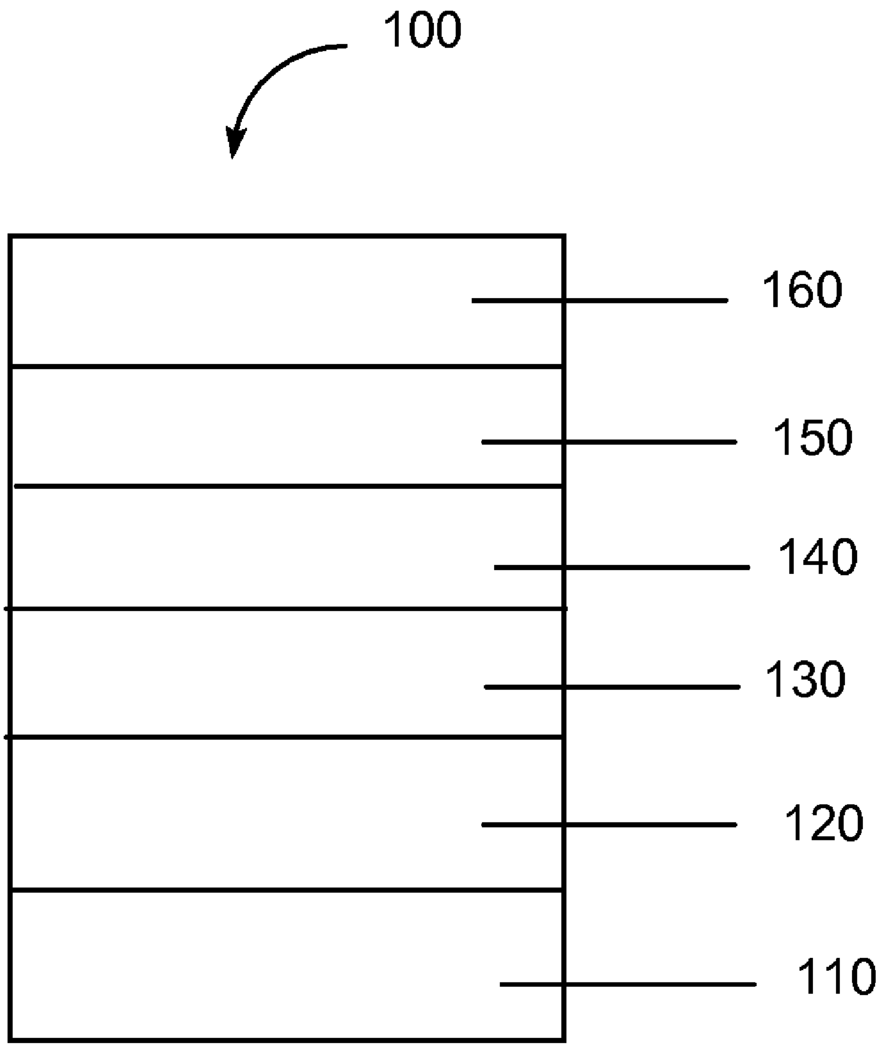
100
160
150
140
130
120
110

AQUEOUS DISPERSIONS OF ELECTRICALLY CONDUCTING POLYMERS CONTAINING HIGH BOILING SOLVENT AND ADDITIVES

RELATED APPLICATION DATA

This application claims priority under 35 U.S.C. §119(e) from U.S. Provisional Application No. 60/938,786 filed on May 18, 2007, which is incorporated by reference herein in its entirety.

BACKGROUND INFORMATION

1. Field of the Disclosure

This disclosure relates in general to aqueous dispersions of electrically conductive polymers containing solvent and additives, and their use in electronic devices.

2. Description of the Related Art

Electronic devices define a category of products that include an active layer. Organic electronic devices have at least one organic active layer. Such devices convert electrical energy into radiation such as light emitting diodes, detect signals through electronic processes, convert radiation into electrical energy, such as photovoltaic cells, or include one or more organic semiconductor layers.

Organic light-emitting diodes (OLEDs) are an organic electronic device comprising an organic layer capable of electroluminescence. OLEDs containing conducting polymers can have the following configuration:

anode/buffer layer/EL material/cathode with additional layers between the electrodes. The anode is typically any material that has the ability to inject holes into the EL material, such as, for example, indium/tin oxide (ITO). The anode is optionally supported on a glass or plastic substrate. EL materials include fluorescent compounds, fluorescent and phosphorescent metal complexes, conjugated polymers, and mixtures thereof. The cathode is typically any material (such as, e.g., Ca or Ba) that has the ability to inject electrons into the EL material. Electrically conducting polymers having low conductivity in the range of $10^{-3}$ to $10^{-7}$ S/cm are commonly used as the buffer layer in direct contact with an electrically conductive, inorganic oxide anode such as ITO.

Electrically conducting polymers which have the ability to carry a high current when subjected to a low electrical voltage, may have utility as electrodes for electronic devices. However, many conductive polymers have conductivities which are too low for use as electrodes. Furthermore, the mechanical strength of films made from the polymers, either self-standing or on a substrate, may not be sufficient for the electrode applications.

Accordingly, there is a continuing need for improved conducting polymer compositions.

SUMMARY

There is provided an aqueous dispersion comprising at least one electrically conductive polymer doped with at least one non-fluorinated polymeric acid polymer, a high-boiling polar solvent, and an additive selected from the group consisting of carbon fullerenes, nanotubes, and combinations thereof.

In another embodiment, there is provided a film formed from the above dispersion.

In another embodiment, electronic devices comprising at least one layer comprising the above film are provided.

BRIEF DESCRIPTION OF THE DRAWINGS

The invention is illustrated by way of example and not limitation in the accompanying figures.

FIG. 1 is a schematic diagram of an organic electronic device.

Skilled artisans will appreciate that objects in the figures are illustrated for simplicity and clarity and have not necessarily been drawn to scale. For example, the dimensions of some of the objects in the figures may be exaggerated relative to other objects to help to improve understanding of embodiments.

DETAILED DESCRIPTION

There is provided an aqueous dispersion of at least one electrically conductive polymer doped with at least one non-fluorinated polymeric acid, at least one high-boiling polar organic solvent, and an additive selected from the group consisting of carbon fullerenes, nanotubes, and combinations thereof. The above dispersion is referred to herein as the "new composition" and the "composite dispersion".

Many aspects and embodiments are described herein and are merely exemplary and not limiting. After reading this specification, skilled artisans will appreciate that other aspects and embodiments are possible without departing from the scope of the invention.

Other features and benefits of any one or more of the embodiments will be apparent from the following detailed description, and from the claims. The detailed description first addresses Definitions and Clarification of Terms followed by the Doped Electrically Conductive Polymer, the Solvent, the Additive, Preparation of the Doped Electrically Conductive Polymer Composition, Buffer Layers, Electronic Devices, and finally, Examples.

1. Definitions and Clarification of Terms Used in the Specification and Claims Before addressing details of embodiments described below, some terms are defined or clarified.

The term "conductor" and its variants are intended to refer to a layer material, member, or structure having an electrical property such that current flows through such layer material, member, or structure without a substantial drop in potential. The term is intended to include semiconductors. In some embodiments, a conductor will form a layer having a conductivity of at least $10^{-7}$ S/cm.

The term "electrically conductive" as it refers to a material, is intended to mean a material which is inherently or intrinsically capable of electrical conductivity without the addition of carbon black or conductive metal particles.

The term "polymer" is intended to mean a material having at least one repeating monomeric unit. The term includes homopolymers having only one kind, or species, of monomeric unit, and copolymers having two or more different monomeric units, including copolymers formed from monomeric units of different species.

The term "acid polymer" refers to a polymer having acidic groups.

The term "acidic group" refers to a group capable of ionizing to donate a hydrogen ion to a Brøonsted base.

The term "highly-fluorinated" refers to a compound in which at least 90% of the available hydrogens bonded to carbon have been replaced by fluorine.

The terms "fully-fluorinated" and "perfluorinated" are used interchangeably and refer to a compound where all of the available hydrogens bonded to carbon have been replaced by fluorine.

The term "polar" refers to a molecule that has a permanent electric dipole.

The term "high-boiling solvent" refers to an organic compound which is a liquid at room temperature and has a boiling point of greater than 100° C.

The term "doped" as it refers to an electrically conductive polymer, is intended to mean that the electrically conductive polymer has a polymeric counterion to balance the charge on the conductive polymer.

The term "doped conductive polymer" is intended to mean the conductive polymer and the polymeric counterion that is associated with it.

The term "layer" is used interchangeably with the term "film" and refers to a coating covering a desired area. The term is not limited by size. The area can be as large as an entire device or as small as a specific functional area such as the actual visual display, or as small as a single sub-pixel. Layers and films can be formed by any conventional deposition technique, including vapor deposition, liquid deposition (continuous and discontinuous techniques), and thermal transfer.

The term "carbon nanotube" refers to an allotrope of carbon having a nanostructure where the length-to-diameter ratio exceeds one million.

The term "fullerene" refers to cage-like, hollow molecules composed of hexagonal and pentagonal groups of carbon atoms. In some embodiments, there are at least 60 carbon atoms present in the molecule.

The term "nanoparticle" refers to a material having a particle size less than 100 nm. In some embodiments, the particle size is less than 10 nm. In some embodiments, the particle size is less than 5 nm.

The term "aqueous" refers to a liquid that has a significant portion of water, and in one embodiment it is at least about 40% by weight water; in some embodiments, at least about 60% by weight water.

The term "hole transport" when referring to a layer, material, member, or structure, is intended to mean such layer, material, member, or structure facilitates migration of positive charges through the thickness of such layer, material, member, or structure with relative efficiency and small loss of charge.

The term "electron transport" means when referring to a layer, material, member or structure, such a layer, material, member or structure that promotes or facilitates migration of negative charges through such a layer, material, member or structure into another layer, material, member or structure.

Although light-emitting materials may also have some charge transport properties, the terms "hole transport layer, material, member, or structure" and "electron transport layer, material, member, or structure" are not intended to include a layer, material, member, or structure whose primary function is light emission.

The term "organic electronic device" is intended to mean a device including one or more semiconductor layers or materials. Organic electronic devices include, but are not limited to: (1) devices that convert electrical energy into radiation (e.g., a light-emitting diode, light emitting diode display, diode laser, or lighting panel), (2) devices that detect signals through electronic processes (e.g., photodetectors photoconductive cells, photoresistors, photoswitches, phototransistors, phototubes, infrared ("IR") detectors, or biosensors), (3) devices that convert radiation into electrical energy (e.g., a photovoltaic device or solar cell), and (4) devices that include one or more electronic components that include one or more organic semiconductor layers (e.g., a transistor or diode).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Group numbers corresponding to columns within the Periodic Table of the elements use the "New Notation" convention as seen in the *CRC Handbook of Chemistry and Physics,* $81^{st}$ Edition (2000-2001).

Unless otherwise defined, all technical and scientific terms used herein have the same meaning as commonly understood by one of ordinary skill in the art to which this invention belongs. In the Formulae, the letters Q, R, T, W, X, Y, and Z are used to designate atoms or groups which are defined within. All other letters are used to designate conventional atomic symbols. Group numbers corresponding to columns within the Periodic Table of the elements use the "New Notation" convention as seen in the *CRC Handbook of Chemistry and Physics,* $81^{st}$ Edition (2000).

To the extent not described herein, many details regarding specific materials, processing acts, and circuits are conventional and may be found in textbooks and other sources within the organic light-emitting diode display, lighting source, photodetector, photovoltaic, and semiconductive member arts.

2. Dosed Electrically Conductive Polymers

The doped electrically conductive polymer has a polymeric counterion derived from a polymeric acid to balance the charge on the conductive polymer.

a. Electrically Conductive Polymer

Any electrically conductive polymer can be used in the new composition. In some embodiments, the electrically conductive polymer will form a film which has a conductivity greater than 0.1 S/cm. In some embodiments, the new compositions described herein can be used to form films having a conductivity greater than 100 S/cm.

The conductive polymers suitable for the new composition are made from at least one monomer which, when polymerized alone, forms an electrically conductive homopolymer. Such monomers are referred to herein as "conductive precursor monomers." Monomers which, when polymerized alone form homopolymers which are not electrically conductive, are referred to as "non-conductive precursor monomers." The conductive polymer can be a homopolymer or a copolymer. Conductive copolymers suitable for the new composition can be made from two or more conductive precursor monomers or from a combination of one or more conductive precursor monomers and one or more non-conductive precursor monomers.

In some embodiments, the conductive polymer is made from at least one conductive precursor monomer selected from thiophenes, pyrroles, anilines, and polycyclic aromatics. The term "polycyclic aromatic" refers to compounds having more than one aromatic ring. The rings may be joined by one or more bonds, or they may be fused together. The term "aromatic ring" is intended to include heteroaromatic rings. A "polycyclic heteroaromatic" compound has at least one heteroaromatic ring.

In some embodiments, the conductive polymer is made from at least one precursor monomer selected from thiophenes, selenophenes, tellurophenes, pyrroles, anilines, and polycyclic aromatics. The polymers made from these monomers are referred to herein as polythiophenes, poly(selenophenes), poly(tellurophenes), polypyrroles, polyanilines, and polycyclic aromatic polymers, respectively. The term "polycyclic aromatic" refers to compounds having more than one aromatic ring. The rings may be joined by one or more bonds, or they may be fused together. The term "aromatic ring" is intended to include heteroaromatic rings. A "polycyclic heteroaromatic" compound has at least one heteroaromatic ring. In some embodiments, the polycyclic aromatic polymers are poly(thienothiophenes).

In some embodiments, monomers contemplated for use to form the electrically conductive polymer in the new composition comprise Formula I below:

(I)

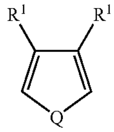

wherein:

Q is selected from the group consisting of S, Se, and Te;

$R^1$ is independently selected so as to be the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, amidosulfonate, ether sulfonate, ester sulfonate, and urethane; or both $R^1$ groups together may form an alkylene or alkenylene chain completing a 3, 4, 5, 6, or 7-membered aromatic or alicyclic ring, which ring may optionally include one or more divalent nitrogen, selenium, tellurium, sulfur or oxygen atoms.

As used herein, the term "alkyl" refers to a group derived from an aliphatic hydrocarbon and includes linear, branched and cyclic groups which may be unsubstituted or substituted. The term "heteroalkyl" is intended to mean an alkyl group, wherein one or more of the carbon atoms within the alkyl group has been replaced by another atom, such as nitrogen, oxygen, sulfur, and the like. The term "alkylene" refers to an alkyl group having two points of attachment.

As used herein, the term "alkenyl" refers to a group derived from an aliphatic hydrocarbon having at least one carbon-carbon double bond, and includes linear, branched and cyclic groups which may be unsubstituted or substituted. The term "heteroalkenyl" is intended to mean an alkenyl group, wherein one or more of the carbon atoms within the alkenyl group has been replaced by another atom, such as nitrogen, oxygen, sulfur, and the like. The term "alkenylene" refers to an alkenyl group having two points of attachment.

As used herein, the following terms for substituent groups refer to the formulae given below:

"alcohol" $—R^3—OH$

"amido" $—R^3—C(O)N(R^6)R^6$

"amidosulfonate" $—R^3—C(O)N(R^6)R^4—SO_3Z$

"benzyl" $—CH_2—C_6H_5$

"carboxylate" $—R^3—C(O)O—Z$ or $—R^3—O—C(O)—Z$

"ether" $—R^3—(O—R^5)_p—O—R^5$

"ether carboxylate" $—R^3—O—R^4—C(O)O—Z$ or $—R^3—O—R^4—O—C(O)—Z$

"ether sulfonate" $—R^3—O—R^4—SO_3Z$

"ester sulfonate" $—R^3—O—C(O)—R^4—SO_3Z$

"sulfonimide" $—R^3—SO_2—NH—SO_2—R^5$

"urethane" $—R^3—O—C(O)—N(R^6)_2$ where all "R" groups are the same or different at each occurrence and:

$R^3$ is a single bond or an alkylene group $R^4$ is an alkylene group $R^5$ is an alkyl group $R^6$ is hydrogen or an alkyl group p is 0 or an integer from 1 to 20

Z is H, alkali metal, alkaline earth metal, $N(R^5)_4$ or $R^5$

Any of the above groups may further be unsubstituted or substituted, and any group may have F substituted for one or more hydrogens, including perfluorinated groups. In some embodiments, the alkyl and alkylene groups have from 1-20 carbon atoms.

In some embodiments, in the monomer, both $R^1$ together form $—W—(CY^1Y^2)_m—W—$, where m is 2 or 3, W is O, S, Se, PO, $NR^6$, $Y^1$ is the same or different at each occurrence and is hydrogen or fluorine, and $Y^2$ is the same or different at each occurrence and is selected from hydrogen, halogen, alkyl, alcohol, amidosulfonate, benzyl, carboxylate, ether, ether carboxylate, ether sulfonate, ester sulfonate, and urethane, where the Y groups may be partially or fully fluorinated. In some embodiments, all Y are hydrogen. In some embodiments, the polymer is poly(3,4-ethylenedioxythiophene). In some embodiments, at least one Y group is not hydrogen. In some embodiments, at least one Y group is a substituent having F substituted for at least one hydrogen. In some embodiments, at least one Y group is perfluorinated.

In some embodiments, the monomer has Formula I(a):

(Ia)

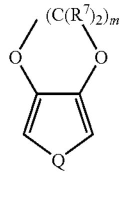

wherein:

Q is selected from the group consisting of S, Se, and Te;

$R^7$ is the same or different at each occurrence and is selected from hydrogen, alkyl, heteroalkyl, alkenyl, heteroalkenyl, alcohol, amidosulfonate, benzyl, carboxylate, ether, ether carboxylate, ether sulfonate, ester sulfonate, and urethane, with the proviso that at least one $R^7$ is not hydrogen, and m is 2 or 3.

In some embodiments of Formula I(a), m is two, one $R^7$ is an alkyl group of more than 5 carbon atoms, and all other $R^7$ are hydrogen. In some embodiments of Formula I(a), at least one $R^7$ group is fluorinated. In some embodiments, at least one $R^7$ group has at least one fluorine substituent. In some embodiments, the $R^7$ group is fully fluorinated.

In some embodiments of Formula I(a), the $R^7$ substituents on the fused alicyclic ring on the monomer offer improved solubility of the monomers in water and facilitate polymerization in the presence of the fluorinated acid polymer.

In some embodiments of Formula I(a), m is 2, one $R^7$ is sulfonic acid-propylene-ether-methylene and all other $R^7$ are hydrogen. In some embodiments, m is 2, one $R^7$ is propyl-ether-ethylene and all other $R^7$ are hydrogen. In some embodiments, m is 2, one $R^7$ is methoxy and all other $R^7$ are hydrogen. In some embodiments, one $R^7$ is sulfonic acid difluoromethylene ester methylene ($-CH_2-O-C(O)-CF_2-SO_3H$), and all other $R^7$ are hydrogen.

In some embodiments, pyrrole monomers contemplated for use to form the electrically conductive polymer in the new composition comprise Formula II below.

(II)

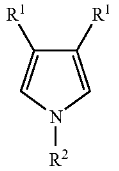

where in Formula II:

$R^1$ is independently selected so as to be the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, amidosulfonate, ether carboxylate, ether sulfonate, ester sulfonate, and urethane; or both $R^1$ groups together may form an alkylene or alkenylene chain completing a 3, 4, 5, 6, or 7-membered aromatic or alicyclic ring, which ring may optionally include one or more divalent nitrogen, sulfur, selenium, tellurium, or oxygen atoms; and $R^2$ is independently selected so as to be the same or different at each occurrence and is selected from hydrogen, alkyl, alkenyl, aryl, alkanoyl, alkylthioalkyl, alkylaryl, arylalkyl, amino, epoxy, silane, siloxane, alcohol, benzyl, carboxylate, ether, ether carboxylate, ether sulfonate, ester sulfonate, and urethane.

In some embodiments, $R^1$ is the same or different at each occurrence and is independently selected from hydrogen, alkyl, alkenyl, alkoxy, cycloalkyl, cycloalkenyl, alcohol, benzyl, carboxylate, ether, amidosulfonate, ether carboxylate, ether sulfonate, ester sulfonate, urethane, epoxy, silane, siloxane, and alkyl substituted with one or more of sulfonic acid, carboxylic acid, acrylic acid, phosphoric acid, phosphonic acid, halogen, nitro, cyano, hydroxyl, epoxy, silane, or siloxane moieties.

In some embodiments, $R^2$ is selected from hydrogen, alkyl, and alkyl substituted with one or more of sulfonic acid, carboxylic acid, acrylic acid, phosphoric acid, phosphonic acid, halogen, cyano, hydroxyl, epoxy, silane, or siloxane moieties.

In some embodiments, the pyrrole monomer is unsubstituted and both $R^1$ and $R^2$ are hydrogen.

In some embodiments, both $R^1$ together form a 6- or 7-membered alicyclic ring, which is further substituted with a group selected from alkyl, heteroalkyl, alcohol, benzyl, carboxylate, ether, ether carboxylate, ether sulfonate, ester sulfonate, and urethane. These groups can improve the solubility of the monomer and the resulting polymer. In some embodiments, both $R^1$ together form a 6- or 7-membered alicyclic ring, which is further substituted with an alkyl group. In some embodiments, both $R^1$ together form a 6- or 7-membered alicyclic ring, which is further substituted with an alkyl group having at least 1 carbon atom.

In some embodiments, both $R^1$ together form $-O-(CHY)_m-O-$, where m is 2 or 3, and Y is the same or different at each occurrence and is selected from hydrogen, alkyl, alcohol, benzyl, carboxylate, amidosulfonate, ether, ether carboxylate, ether sulfonate, ester sulfonate, and urethane. In some embodiments, at least one Y group is not hydrogen. In some embodiments, at least one Y group is a substituent having F substituted for at least one hydrogen. In some embodiments, at least one Y group is perfluorinated.

In some embodiments, aniline monomers contemplated for use to form the electrically conductive polymer in the new composition comprise Formula III below.

(III)

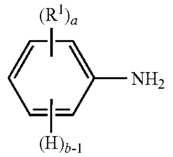

wherein:

a is 0 or an integer from 1 to 4;

b is an integer from 1 to 5, with the proviso that a+b=5; and $R^1$ is independently selected so as to be the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, cyano, hydroxyl, epoxy, silane, siloxane, alcohol, benzyl, carboxylate, ether, ether carboxylate, amidosulfonate, ether sulfonate, ester sulfonate, and urethane; or both $R^1$ groups together may form an alkylene or alkenylene chain completing a 3, 4, 5, 6, or 7-membered aromatic or alicyclic ring, which ring may optionally include one or more divalent nitrogen, sulfur or oxygen atoms.

When polymerized, the aniline monomeric unit can have Formula IV(a) or Formula IV(b) shown below, or a combination of both formulae.

IV(a)

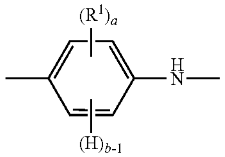

IV(b)

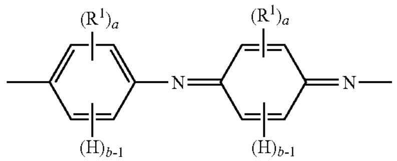

where a, b and $R^1$ are as defined above.

In some embodiments, the aniline monomer is unsubstituted and a=0.

In some embodiments, a is not 0 and at least one $R^1$ is fluorinated. In some embodiments, at least one $R^1$ is perfluorinated.

In some embodiments, fused polycyclic heteroaromatic monomers contemplated for use to form the electrically conductive polymer in the new composition have two or more fused aromatic rings, at least one of which is heteroaromatic. In some embodiments, the fused polycyclic heteroaromatic monomer has Formula V:

(V)

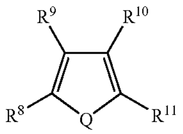

wherein:

Q is S, Se, Te, or $NR^6$;

$R^6$ is hydrogen or alkyl;

$R^8$, $R^9$, $R^{10}$, and $R^{11}$ are independently selected so as to be the same or different at each occurrence and are selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, nitrile, cyano, hydroxyl, epoxy, silane, siloxane, alcohol, benzyl, carboxylate, ether, ether carboxylate, amidosulfonate, ether sulfonate, ester sulfonate, and urethane; and at least one of $R^8$ and $R^9$, $R^9$ and $R^{10}$, and $R^{10}$ and $R^{11}$ together form an alkenylene chain completing a 5 or 6-membered aromatic ring, which ring may optionally include one or more divalent nitrogen, sulfur, selenium, tellurium, or oxygen atoms.

In some embodiments, the fused polycyclic heteroaromatic monomer has a formula selected from the group consisting of Formula V(a), V(b), V(c), V(d), V(e), V(f), V(g), V(h), V(i), V(j), and V(k):

(Va)

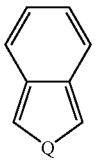

(Vb)

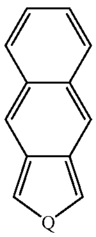

-continued (Vc)

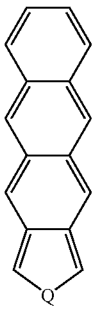

(Vd)

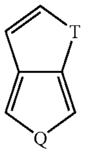

(Ve)

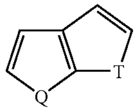

(Vf)

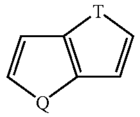

(Vg)

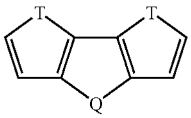

(Vh)

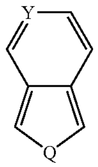

(Vi)

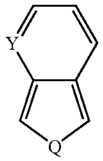

(Vj)

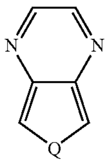

(Vk)

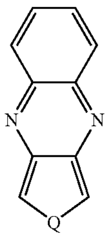

wherein:

Q is S, Se, Te, or NH; and

T is the same or different at each occurrence and is selected from S, $NR^6$, O, $SiR^6_2$, Se, Te, and $PR^6$;

Y is N; and $R^6$ is hydrogen or alkyl.

The fused polycyclic heteroaromatic monomers may be further substituted with groups selected from alkyl, heteroalkyl, alcohol, benzyl, carboxylate, ether, ether carboxylate, ether sulfonate, ester sulfonate, and urethane. In some embodiments, the substituent groups are fluorinated. In some embodiments, the substituent groups are fully fluorinated.

In some embodiments, the fused polycyclic heteroaromatic monomer is a thieno(thiophene). Such compounds have been discussed in, for example, Macromolecules, 34, 5746-5747 (2001); and Macromolecules, 35, 7281-7286 (2002). In some embodiments, the thieno(thiophene) is selected from thieno(2,3-b)thiophene, thieno(3,2-b)thiophene, and thieno(3,4-b)thiophene. In some embodiments, the thieno(thiophene) monomer is further substituted with at least one group selected from alkyl, heteroalkyl, alcohol, benzyl, carboxylate, ether, ether carboxylate, ether sulfonate, ester sulfonate, and urethane. In some embodiments, the substituent groups are fluorinated. In some embodiments, the substituent groups are fully fluorinated.

In some embodiments, polycyclic heteroaromatic monomers contemplated for use to form the polymer in the new composition comprise Formula VI:

(VI)

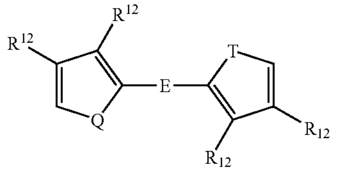

wherein:

Q is S, Se, Te, or $NR^6$;

T is selected from S, $NR^6$, O, $SiR^6_2$, Se, Te, and $PR^6$;

E is selected from alkenylene, arylene, and heteroarylene;

$R^6$ is hydrogen or alkyl;

$R^{12}$ is the same or different at each occurrence and is selected from hydrogen, alkyl, alkenyl, alkoxy, alkanoyl, alkythio, aryloxy, alkylthioalkyl, alkylaryl, arylalkyl, amino, alkylamino, dialkylamino, aryl, alkylsulfinyl, alkoxyalkyl, alkylsulfonyl, arylthio, arylsulfinyl, alkoxycarbonyl, arylsulfonyl, acrylic acid, phosphoric acid, phosphonic acid, halogen, nitro, nitrile, cyano, hydroxyl, epoxy, silane, siloxane, alcohol, benzyl, carboxylate, ether, ether carboxylate, amidosulfonate, ether sulfonate, ester sulfonate, and urethane; or both $R^{12}$ groups together may form an alkylene or alkenylene chain completing a 3, 4, 5, 6, or 7-membered aromatic or alicyclic ring, which ring may optionally include one or more divalent nitrogen, sulfur, selenium, tellurium, or oxygen atoms.

In some embodiments, the electrically conductive polymer is a copolymer of a precursor monomer and at least one second monomer. Any type of second monomer can be used, so long as it does not detrimentally affect the desired properties of the copolymer. In some embodiments, the second monomer comprises no more than 50% of the polymer, based on the total number of monomer units. In some embodiments, the second monomer comprises no more than 30%, based on the total number of monomer units. In some embodiments, the second monomer comprises no more than 10%, based on the total number of monomer units.

Exemplary types of second monomers include, but are not limited to, alkenyl, alkynyl, arylene, and heteroarylene. Examples of second monomers include, but are not limited to, fluorene, oxadiazole, thiadiazole, benzothiadiazole, phenylenevinylene, phenyleneethynylene, pyridine, diazines, and triazines, all of which may be further substituted.

In some embodiments, the copolymers are made by first forming an intermediate precursor monomer having the structure A-B-C, where A and C represent precursor monomers, which can be the same or different, and B represents a second monomer. The A-B-C intermediate precursor monomer can be prepared using standard synthetic organic techniques, such as Yamamoto, Stille, Grignard metathesis, Suzuki, and Negishi couplings. The copolymer is then formed by oxidative polymerization of the intermediate precursor monomer alone, or with one or more additional precursor monomers.

In some embodiments, the electrically conductive polymer is selected from the group consisting of a polythiophene, a polypyrrole, a polymeric fused polycyclic heteroaromatic, a copolymer thereof, and combinations thereof.

In some embodiments, the electrically conductive polymer is selected from the group consisting of poly(3,4-ethylenedioxythiophene), unsubstituted polypyrrole, poly(thieno(2,3-b)thiophene), poly(thieno(3,2-b)thiophene), and poly(thieno(3,4-b)thiophene).

b. Non-Fluorinated Polymeric Acid

Any non-fluorinated polymeric acid, which is capable of doping the conductive polymer, can be used to make new compositions. Any polymer having acidic groups with acidic protons can be used. The use of such acids with conducting polymers such as polythiophenes, polyanilines and polypyrroles is well known in the art. Examples of acidic groups include, but are not limited to, carboxylic acid groups, sulfonic acid groups, sulfonimide groups, phosphoric acid groups, phosphonic acid groups, and combinations thereof. The acidic groups can all be the same, or the polymer may have more than one type of acidic group.

In one embodiment, the acid is a non-fluorinated polymeric sulfonic acid. Some non-limiting examples of the acids are poly(styrenesulfonic acid) ("PSSA"), poly(2-acrylamido-2-methyl-1-propanesulfonic acid) ("PAAMPSA"), and mixtures thereof.

The amount of non-fluorinated polymeric acid present is generally in excess of that required to counterbalance the charge on the conducting polymer. In some embodiments, the ratio of acid equivalents of non-fluorinated polymeric acid to molar equivalents of conducting polymer is in the range of 1-5.

The amount of doped conducting polymer in the composite dispersion is generally at least 0.1 wt. %, based on the total weight of the dispersion. In some embodiments, the wt. % is from 0.2 to 5.

3. Solvent

The solvent is a high-boiling, polar organic liquid. In some embodiments, the solvent has a boiling point ("b.p.") of at least 120° C.; in some embodiments, at least 150° C. The solvent is soluble in, miscible with, or dispersible in water. Examples of solvents include, but are not limited to ethylene glycol, dimethylsulfoxide, dimethylacetamide, and N-methylpyrrolidone. Mixtures of solvents may also be used.

The solvent is generally present in the composite dispersion in the amount of from 1 to 15 wt. %, based on the total weight of the dispersion; in some embodiments, from 5 to 10 wt. %.

4. Additive

The additive is selected from the group consisting of carbon fullerenes, nanotubes and combinations thereof.

Fullerenes are an allotrope of carbon characterized by a closed-cage structure consisting of an even number of three-coordinate carbon atoms devoid of hydrogen atoms. The fullerenes are well known and have been extensively studied.

Examples of fullerenes include C60, C60-PCMB, and C70, shown below,

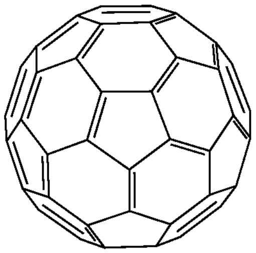

C60

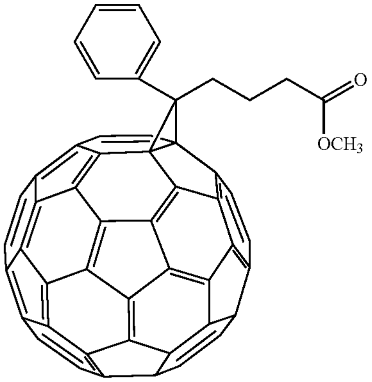

PCBM

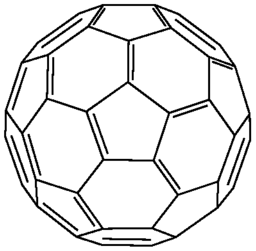

C70 as well as C84 and higher fullerenes. Any of the fullerenes may be derivatized with a (3-methoxycarbonyl)-propyl-1-phenyl group ("PCBM"), such as C70-PCBM, C84-PCBM, and higher analogs. Combinations of fullerenes can be used.

In some embodiments, the fullerene is selected from the group consisting of C60, C60-PCMB, C70, C70-PCMB, and combinations thereof.

Carbon nanotubes have a cylindrical shape. The nanotubes can be single-walled or multi-walled. The materials are made by methods including arc discharge, laser ablation, high pressure carbon monoxide, and chemical vapor deposition. The materials are well known and commercially available. In some embodiments, single-walled nanotubes are used.

The amount of additive present is generally at least 0.2 wt. %, based on the total weight of the dispersion. The weight ratio of conductive polymer to additive is generally in the range of 0.5 to 50; in some embodiments, the ratio is 1 to 10.

5. Preparation of the Composite Dispersion

In the following discussion, the doped conductive polymer, solvent, and additive will be referred to in the singular. However, it is understood that more than one of any or all of these may be used.

The new electrically conductive polymer composition is prepared by first forming the doped conductive polymer and then adding the solvent and the additive, in any order.

The doped electrically conductive polymer is generally formed by oxidative polymerization of the precursor monomer in the presence of the non-fluorinated polymeric acid in an aqueous medium. Many of these materials are commercially available. The additive can be dispersed in water or a solvent/water mixture. These mixtures can then be added to an aqueous dispersion of the doped conductive polymer, optionally with additional solvent.

Alternatively, the additive can be added to the doped conductive polymer dispersion directly as a solid. The solvent can be added to this mixture.

In some embodiments, the pH is increased either prior to the addition of the additive or after. The pH can be adjusted by treatment with cation exchange resins, and/or base resins prior to additive addition. In some embodiments, the pH is adjusted by the addition of aqueous base solution. Cations for the base can be, but are not limited to, alkali metal, alkaline earth metal, ammonium, and alkylammonium. In some embodiments, alkali metal is preferred over alkaline earth metal cations.

Films made from the composite aqueous dispersions described herein, are hereinafter referred to as "the new films described herein". The films can be made using any liquid deposition technique, including continuous and discontinuous techniques. Continuous deposition techniques, include but are not limited to, spin coating, gravure coating, curtain coating, dip coating, slot-die coating, spray coating, and continuous nozzle coating. Discontinuous deposition techniques include, but are not limited to, ink jet printing, gravure printing, and screen printing.

The films thus formed are smooth, relatively transparent, and can have a conductivity greater than at least 100 S/cm.

7. Buffer Layers

Organic light-emitting diodes (OLEDs) are an organic electronic device comprising an organic layer capable of electroluminescence. OLEDs can have the following configuration:

anode/buffer layer/EL material/cathode with additional layers between the electrodes. Electrically conducting polymers having low conductivity in the range of $10^{-3}$ to $10^{-7}$ S/cm are commonly used as the buffer layer in direct contact with an electrically conductive, inorganic oxide anode such as ITO. However, films of the new compositions having conductivity greater than 100 S/cm can serve both anode and buffer layer functions.

In another embodiment of the invention, there are provided buffer layers deposited from composite aqueous dispersions. The term "buffer layer" or "buffer material" is intended to mean electrically conductive or semiconductive materials and may have one or more functions in an organic electronic device, including but not limited to, planarization of the underlying layer, charge transport and/or charge injection properties, scavenging of impurities such as oxygen or metal ions, and other aspects to facilitate or to improve the performance of the organic electronic device. The term "layer" is used interchangeably with the term "film" and refers to a coating covering a desired area. The term is not limited by size. The area can be as large as an entire device or as small as a specific functional area such as the actual visual display, or as small as a single sub-pixel. Layers and films can be formed by any conventional deposition technique, including vapor deposition, liquid deposition (continuous and discontinuous techniques), and thermal transfer. Continuous deposition techniques, include but are not limited to, spin coating, gravure coating, curtain coating, dip coating, slot-die coating, spray coating, and continuous nozzle coating. Discontinuous deposition techniques include, but are not limited to, ink jet printing, gravure printing, and screen printing.

8. Electronic Devices

The new films described herein can be used in electronic devices where the high conductivity is desired in combination with transparency. In some embodiments, the films are used as electrodes. In some embodiments, the films are used as transparent conductive coatings.

In another embodiment of the invention, there are provided electronic devices comprising at least one electroactive layer positioned between two electrical contact layers, wherein the device further includes the new buffer layer. The term "electroactive" when referring to a layer or material is intended to mean a layer or material that exhibits electronic or electroradiative properties. An electroactive layer material may emit radiation or exhibit a change in concentration of electron-hole pairs when receiving radiation.

As shown in FIG. 1, a typical device, 100, has an anode layer 110, an electroactive layer 140, and a cathode layer 160. Also shown are three optional layers: buffer layer 120; hole transport layer 130; and electron injection/transport layer 150.

The device may include a support or substrate (not shown) that can be adjacent to the anode layer 110 or the cathode layer 160. Most frequently, the support is adjacent to the anode layer 110. The support can be flexible or rigid, organic or inorganic. Examples of support materials include, but are not limited to, glass, ceramic, metal, and plastic films.

The anode layer 110 is an electrode that is more efficient for injecting holes compared to the cathode layer 160. The new films of this invention described herein are particularly suitable as the anode layer because of their high conductivity. In some embodiments, they have a conductivity of 100 S/cm or greater. In some embodiments, they have a conductivity of 200 S/cm or greater. They are deposited onto substrates using a variety of techniques well-known to those skilled in the art. Typical deposition techniques include liquid deposition (continuous and discontinuous techniques), and thermal transfer.

In some embodiments, the new films described herein are used alone as an anode without optional buffer layer 120. In this embodiment, the new films of this invention serve the functions of both anode layer and buffer layer.

In some embodiments, the new films described herein are used as the top layer in a bilayer or multilayer anode. The other anode layers can include materials containing a metal, mixed metal, alloy, metal oxide or mixed oxide. Suitable materials include the mixed oxides of the Group 2 elements (i.e., Be, Mg, Ca, Sr, Ba, Ra), the Group 11 elements, the elements in Groups 4, 5, and 6, and the Group 8-10 transition elements. If the anode layer 110 is to be light transmitting, mixed oxides of Groups 12, 13 and 14 elements, such as indium-tin-oxide, may be used. As used herein, the phrase "mixed oxide" refers to oxides having two or more different cations selected from the Group 2 elements or the Groups 12, 13, or 14 elements. Some non-limiting, specific examples of materials for anode layer 110 include, but are not limited to, indium-tin-oxide ("ITO"), indium-zinc-oxide, aluminum-tin-oxide, gold, silver, copper, and nickel. The mixed oxide layer may be formed by a chemical or physical vapor deposition process or spin-cast process. Chemical vapor deposition may be performed as a plasma-enhanced chemical vapor deposition ("PECVD") or metal organic chemical vapor deposition ("MOCVD"). Physical vapor deposition can include all forms of sputtering, including ion beam sputtering, as well as e-beam evaporation and resistance evaporation. Specific forms of physical vapor deposition include rf magnetron sputtering and inductively-coupled plasma physical vapor deposition ("IMP-PVD"). These deposition techniques are well known within the semiconductor fabrication arts.

In one embodiment, the mixed oxide layer is patterned. The pattern may vary as desired. The layers can be formed in a pattern by, for example, positioning a patterned mask or resist on the first flexible composite barrier structure prior to applying the first electrical contact layer material. Alternatively, the layers can be applied as an overall layer (also called blanket deposit) and subsequently patterned using, for example, a patterned resist layer and wet chemical or dry etching techniques. Other processes for patterning that are well known in the art can also be used.

Optional buffer layer 120 may be present adjacent to the anode layer 110. The term "buffer layer" or "buffer material" is intended to mean electrically conductive or semiconductive materials having conductivity usually in the range between $10^{-3}$ to $10^{-7}$ S/cm, but higher conductivity can be used for some device geometries. The buffer layer may have one or more functions in an organic electronic device, including but not limited to, planarization of the underlying layer, charge transport and/or charge injection properties, scavenging of impurities such as oxygen or metal ions, and other aspects to facilitate or to improve the performance of the organic electronic device.

In some embodiments, the buffer layer 120 comprises the new film described herein, where the conductivity is 100 S/cm or less.

In some embodiments, optional hole transport layer 130 is present. between anode layer 110 and electroactive layer 140. In some embodiments, optional hole transport layer is present between a buffer layer 120 and electroactive layer 140. Examples of hole transport materials have been summarized for example, in Kirk-Othmer Encyclopedia of Chemical Technology, Fourth Edition, Vol. 18, p. 837-860, 1996, by Y. Wang. Both hole transporting molecules and polymers can be used. Commonly used hole transporting molecules include, but are not limited to: 4,4',4"-tris(N,N-diphenyl-amino)-triphenylamine (TDATA); 4,4',4"-tris(N-3-methylphenyl-N-phenyl-amino)-triphenylamine (MTDATA); N,N'-diphenyl-N,N'-bis(3-methylphenyl)-[1,1'-biphenyl]-4,4'-diamine (TPD); 1,1-bis[(di-4-tolylamino)phenyl]cyclohexane (TAPC); N,N'-bis(4-methylphenyl)-N,N'-bis(4-ethylphenyl)-[1,1'-(3,3'-dimethyl)biphenyl]-4,4'-diamine (ETPD);

tetrakis-(3-methylphenyl)-N,N,N',N'-2,5-phenylenediamine (PDA); α-phenyl-4-N,N-diphenylaminostyrene (TPS); p-(diethylamino)benzaldehyde diphenylhydrazone (DEH); triphenylamine (TPA); bis[4-(N,N-diethylamino)-2-methylphenyl](4-methylphenyl)methane (MPMP); 1-phenyl-3-[p-(diethylamino)styryl]-5-[p-(diethylamino)phenyl]pyrazoline (PPR or DEASP); 1,2-trans-bis(9H-carbazol-9-yl) cyclobutane (DCZB); N,N,N',N'-tetrakis(4-methylphenyl)-(1,1'-biphenyl)-4,4'-diamine (TTB); N,N'-bis(naphthalen-1-yl)-N,N'-bis-(phenyl)benzidine (α-NPB); and porphyrinic compounds, such as copper phthalocyanine. Commonly used hole transporting polymers include, but are not limited to, polyvinylcarbazole, (phenylmethyl)polysilane, poly(dioxythiophenes), polyanilines, and polypyrroles. It is also possible to obtain hole transporting polymers by doping hole transporting molecules such as those mentioned above into polymers such as polystyrene and polycarbonate.

Depending upon the application of the device, the electroactive layer 140 can be a light-emitting layer that is activated by an applied voltage (such as in a light-emitting diode or light-emitting electrochemical cell), a layer of material that responds to radiant energy and generates a signal with or without an applied bias voltage (such as in a photodetector). In one embodiment, the electroactive material is an organic electroluminescent (“EL”) material, Any EL material can be used in the devices, including, but not limited to, small molecule organic fluorescent compounds, fluorescent and phosphorescent metal complexes, conjugated polymers, and mixtures thereof. Examples of fluorescent compounds include, but are not limited to, pyrene, perylene, rubrene, coumarin, derivatives thereof, and mixtures thereof. Examples of metal complexes include, but are not limited to, metal chelated oxinoid compounds, such as tris(8-hydroxyquinolate)aluminum (Alq3); cyclometallated iridium and platinum electroluminescent compounds, such as complexes of iridium with phenylpyridine, phenylquinoline, or phenylpyrimidine ligands as disclosed in Petrov et al., U.S. Pat. No. 6,670,645 and Published PCT Applications WO 03/063555 and WO 2004/016710, and organometallic complexes described in, for example, Published PCT Applications WO 03/008424, WO 03/091688, and WO 03/040257, and mixtures thereof. Electroluminescent emissive layers comprising a charge carrying host material and a metal complex have been described by Thompson et al., in U.S. Pat. No. 6,303,238, and by Burrows and Thompson in published PCT applications WO 00/70655 and WO 01/41512. Examples of conjugated polymers include, but are not limited to poly(phenylenevinylenes), polyfluorenes, poly(spirobifluorenes), polythiophenes, poly(p-phenylenes), copolymers thereof, and mixtures thereof.

Optional layer 150 can function both to facilitate electron injection/transport, and can also serve as a confinement layer to prevent quenching reactions at layer interfaces. More specifically, layer 150 may promote electron mobility and reduce the likelihood of a quenching reaction if layers 140 and 160 would otherwise be in direct contact. Examples of materials for optional layer 150 include, but are not limited to, metal chelated oxinoid compounds, such as bis(2-methyl-8-quinolinolato)(para-phenyl-phenolato)aluminum(III) (BAIQ) and tris(8-hydroxyquinolato)aluminum ($Alq_3$); tetrakis(8-hydroxyquinolinato)zirconium; azole compounds such as 2-(4-biphenylyl)-5-(4-t-butylphenyl)-1,3,4-oxadiazole (PBD), 3-(4-biphenylyl)-4-phenyl-5-(4-t-butylphenyl)-1,2,4-triazole (TAZ), and 1,3,5-tri(phenyl-2-benzimidazole)benzene (TPBI); quinoxaline derivatives such as 2,3-bis(4-fluorophenyl)quinoxaline; phenanthroline derivatives such as 9,10-diphenylphenanthroline (DPA) and 2,9-dimethyl-4,7-diphenyl-1,10-phenanthroline (DDPA); and any one or more combinations thereof. Alternatively, optional layer 150 may be inorganic and comprise BaO, LiF, $Li_2O$, or the like.

The cathode layer 160 is an electrode that is particularly efficient for injecting electrons or negative charge carriers. The cathode layer 160 can be any metal or nonmetal having a lower work function than the first electrical contact layer (in this case, the anode layer 110). As used herein, the term “lower work function” is intended to mean a material having a work function no greater than about 4.4 eV. As used herein, “higher work function” is intended to mean a material having a work function of at least approximately 4.4 eV.

Materials for the cathode layer can be selected from alkali metals of Group 1 (e.g., Li, Na, K, Rb, Cs), the Group 2 metals (e.g., Mg, Ca, Ba, or the like), the Group 12 metals, the lanthanides (e.g., Ce, Sm, Eu, or the like), and the actinides (e.g., Th, U, or the like). Materials such as aluminum, indium, yttrium, and combinations thereof, may also be used. Specific non-limiting examples of materials for the cathode layer 160 include, but are not limited to, barium, lithium, cerium, cesium, europium, rubidium, yttrium, magnesium, samarium, and alloys and combinations thereof.

The cathode layer 160 is usually formed by a chemical or physical vapor deposition process. In some embodiments, the cathode layer will be patterned, as discussed above in reference to the anode layer 110.

Other layers in the device can be made of any materials which are known to be useful in such layers upon consideration of the function to be served by such layers.

In some embodiments, an encapsulation layer (not shown) is deposited over the contact layer 160 to prevent entry of undesirable components, such as water and oxygen, into the device 100. Such components can have a deleterious effect on the organic layer 140. In one embodiment, the encapsulation layer is a barrier layer or film. In one embodiment, the encapsulation layer is a glass lid.

Though not depicted, it is understood that the device 100 may comprise additional layers. Other layers that are known in the art or otherwise may be used. In addition, any of the above-described layers may comprise two or more sub-layers or may form a laminar structure. Alternatively, some or all of anode layer 110, the buffer layer 120, the hole transport layer 130, the electron transport layer 150, cathode layer 160, and other layers may be treated, especially surface treated, to increase charge carrier transport efficiency or other physical properties of the devices. The choice of materials for each of the component layers is preferably determined by balancing the goals of providing a device with high device efficiency with device operational lifetime considerations, fabrication time and complexity factors and other considerations appreciated by persons skilled in the art. It will be appreciated that determining optimal components, component configurations, and compositional identities would be routine to those of ordinary skill of in the art.

In one embodiment, the different layers have the following range of thicknesses: anode 110, 500-5000 Å, in one embodiment 1000-2000 Å; optional buffer layer 120, 50-2000 Å, in one embodiment 200-1000 Å; optional hole transport layer 130, 50-2000 Å, in one embodiment 100-1000 Å; photoactive layer 140, 10-2000 Å, in one embodiment 100-1000 Å; optional electron transport layer 150, 50-2000 Å, in one embodiment 100-1000 Å; cathode 160, 200-10000 Å, in one embodiment 300-5000 Å. The location of the electron-hole recombination zone in the device, and thus the emission spectrum of the device, can be affected by the relative thickness of each layer. Thus the thickness of the electron-transport layer should be chosen so that the electron-hole recombination zone is in the light-emitting layer. The desired ratio of layer thicknesses will depend on the exact nature of the materials used.

In operation, a voltage from an appropriate power supply (not depicted) is applied to the device 100. Current therefore passes across the layers of the device 100. Electrons enter the organic polymer layer, releasing photons. In some OLEDs, called active matrix OLED displays, individual deposits of photoactive organic films may be independently excited by the passage of current, leading to individual pixels of light emission. In some OLEDs, called passive matrix OLED displays, deposits of photoactive organic films may be excited by rows and columns of electrical contact layers.

Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. Further, reference to values stated in ranges include each and every value within that range.

EXAMPLES

A) General Procedure of Film Sample Preparation, Four-Probe Electrical Resistance Measurement and Calculation of Electrical Conductivity One small drop of each dispersion sample was placed on a 3"×1" microscope slide placed on a hot plate set at ~170° C. in air. The liquid was spread with a small diameter (~1 mm) glass rod to form a thin film on ⅔ area of the slide as the liquid was evaporating. The slide was removed from the hot plate and the film was trimmed to a long strip with a razor blade. Width of the strip ranged from 0.2 cm to 0.7 cm and the length was about 3 cm. The microscope slide containing the strip was then placed on a hot plate set at 210° C. for 10 minutes. Once cooled to room temperature, silver paste was then painted perpendicular to the length of the strip to form four electrodes. The two inner parallel electrodes were about 0.3 cm to 0.5 cm apart and were connected to a Keithley model 616 electrometer for measurement of voltage. The two outside parallel electrodes were connected to a Keithley model 225 Current Supplier. A series of corresponding current/voltage data obtained at room temperature was recorded to see whether Ohm's law was followed. All the samples in the Examples followed Ohm's law, which provided a more or less identical resistance of the corresponding current/voltage data. Once resistance measurement was done, the area in the two inner electrodes was measured for thickness with a Profilometer. Thickness of the tested films is typically in the range of 1 micrometer (um). Since resistance, thickness, separation length of the two inner electrodes and the width of the filmstrip are known, electrical conductivity is then calculated. The conductivity unit is expressed as S (Siemens)/cm.

Example 1

This example illustrates preparation and film conductivity of a stable aqueous dispersion containing carbon-nanotubes (CNT), electrically conducting polymer, and a high boiling organic liquid.

CNT used in this example was HIPco CE608, purchased from CNI (Carbon Nanotechnologies, Inc.) at Houston, Tex., USA. HIPco CE608 CNT is single wall nanotubes, which contains about 3-4% (w/w) residual catalyst. It was made by a process using high-pressure carbon monoxide and then purified by the Company.

Electrically conducting polymer used in this example is poly(3,4-ethylenedioxythiophene) doped with non-fluorinated doping acid poly(styrenesulfonic acid), abbreviated as "PEDOT/PSSA". PEDOT/PSSA is a well-known electrically conductive polymer. The polymer dispersed in water is commercially available from H. C. Starck GmbH (Leverkuson, Germany) in several grades under a trade name of Baytron-P. Baytron-P HCV4, one of the commercial aqueous dispersion products, purchased from Starck was used. The Baytron-P HCV4 sample was determined gravimetrically to have 1.01% (w/w) solid, which should be PEDOT/PSSA in water. According to the product brochure, the weight ratio of PEDOT:PSSA is 1:2.5.

Prior to preparation of a CNT composite dispersion, an ethylene glycol/water solution was prepared. The solution was for reducing PEDOT-PSSA solid % of HCV4, therefore reducing its viscosity. A 19.93% (w/w) ethylene glycol/water solution was made by adding 3.9988 g ethylene glycol to 16.0610 g deionized water.

0.0876 g CNT were first placed in a glass jug. To the CNT solids, 14.7193 g ethylene glycol (19.93%, w/w)/water solution were added, followed with 13.9081 g Baytron-P HCV4. Based on the quantity of each component, the mixture contains 0.49% (w/w) PEDOT-PSSA, 10.22% (w/w) ethylene glycol, 0.31% (w/w) CNT, and the remaining is water. The mixture was subjected to sonication for 15 minutes continuously using a Branson Model 450 Sonifier having power set at #4. The glass jug was immersed in ice water contained in a tray to remove heat produced from intense cavitation during entire period of sonication. The mixture formed a smooth, stable dispersion without any sign of sedimentation. PH of the dispersion was measured to be 2.1 using a pH meter (model 63) from Jenco Electronics, Ltd (San Diego, Calif.).

Films were prepared according to the general procedure described in thin film preparation. Thin films are optically transmissive and stronger mechanically than those of the conducting polymer without CNT. Thin films were tested for electrical conductivity as described in the general procedure. The conductivity of five film samples at room temperature was measured to be 509.3 S/cm, 667.3 S/cm, 441.3 S/cm, 546.8 S/cm, and 551.2 S/cm.

Example 2

This example illustrates addition of a base solution on stability of the composite dispersion prepared in Example 1.

About 10 g of the dispersion sample made in Example 1 was first adjusted to pH3.9 using 0.5N NaOH/water solution first and then 0.1N NaOH/water as pH got closer to the targeted pH. One half of the pH3.9 dispersion was further adjusted to pH7.0 with sodium hydroxide/water solution too. Concentration of each component in the dispersions was not significantly affected because only a very small amount of base solution was used. Addition of the base solution still maintains homogeneity of the dispersion. There is no sign of sedimentation in both high pH dispersions. The high pH dispersions also form homogeneous films.

Example 3

This example illustrates preparation and film conductivity of a stable aqueous dispersion containing a different carbon nanotube (CNT), electrically conducting polymer, and a high boiling organic liquid.

CNT used in this example was HIPco P0244, also purchased from CNI (Carbon Nanotechnologies, Inc.) at Houston, Tex., USA. HIPco P0244 CNT is single wall nanotubes, which contains about 10% (w/w) residual catalyst. It was made by a process using high-pressure carbon monoxide and then purified by the Company. Electrically conducting polymer used in this example is also Baytron-P HCV4. This lot of sample was determined gravimetrically to have 1.1% (w/w) solid, which should be PEDOT/PSSA in water. According to the product brochure, the weight ratio of PEDOT:PSSA is 1:2.5.

Prior to preparation of a CNT composite dispersion, an ethylene glycol/water solution was prepared. The solution was for reducing PEDOT-PSSA solid % of HCV4, therefore reducing its viscosity. A 18.01% (w/w) ethylene glycol/water solution was made by adding 3.6035 g ethylene glycol to 16.4057 g deionized water.

0.0981 g CNT were first placed in a glass jug. To the CNT solids, 17.2521 g ethylene glycol (18.01%, w/w)/water solution were added, followed with 15.5701 g Baytron-P HCV4. Based on the quantity of each component, the mixture contains 0.52% (w/w) PEDOT-PSSA, 9.44% (w/w) ethylene glycol, 0.298% (w/w) CNT, and the remaining is water. The mixture was subjected to sonication for 28 minutes continuously using a Branson Model 450 Sonifier having power set at #4. The glass jug was immersed in ice water contained in a tray to remove heat produced from intense cavitation during entire period of sonication. The mixture formed a smooth, stable dispersion without any sign of sedimentation. pH of the dispersion was measured to be 2.0 using a pH meter (model 63) from Jenco Electronics, Ltd (San Diego, Calif.).

Films were prepared according to the general procedure described in thin film preparation. Thin films are optically transmissive and stronger mechanically than those of the conducting polymer without CNT. Thin films were tested for electrical conductivity as described in the general procedure. The conductivity of six film samples at room temperature was measured to be 608.7 S/cm, 459.3 S/cm, 366.6 S/cm, 528.8 S/cm, 481.0 S/cm, and 472.3 S/cm.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination.

The use of numerical values in the various ranges specified herein is stated as approximations as though the minimum and maximum values within the stated ranges were both being preceded by the word "about." In this manner slight variations above and below the stated ranges can be used to achieve substantially the same results as values within the ranges. Also, the disclosure of these ranges is intended as a continuous range including every value between the minimum and maximum average values including fractional values that can result when some of components of one value are mixed with those of different value. Moreover, when broader and narrower ranges are disclosed, it is within the contemplation of this invention to match a minimum value from one range with a maximum value from another range and vice versa.

What is claimed is:

1. An aqueous dispersion capable of forming a film having a conductivity of at least 360 S/cm comprising:

at least one electrically conductive polymer comprising a polythiophene doped with a non-fluorinated polymeric acid polymer comprising poly(styrenesulfonic acid);

at least one high-boiling polar solvent, and an additive selected from the group consisting of fullerenes, carbon nanotubes, and combinations thereof.

2. The dispersion of claim 1, wherein the electrically conductive polymer comprising a polythiophene is selected from the group consisting of poly(3,4-ethylenedioxythiophene), poly(thieno(2,3-b)thiophene), poly(thieno(3,2-b)thiophene), and poly(thieno(3,4-b)thiophene).

3. The dispersion of claim 1 wherein the amount of doped conducting polymer in the composite dispersion is in the range of from 0.1% to 5% by weight based on the total weight of the dispersion.

4. The dispersion of claim 1 wherein an additive is a fullerene.

5. The dispersion of claim 4 wherein the fullerene is selected from the group consisting of C60, C60-PCMB, C70, C70-PCBM, and combinations thereof.

6. The dispersion of claim 1 wherein the amount of additive present is in the range of from 0.2% to 50% by weight based on the total weight of the dispersion.

7. The dispersion of claim 1 wherein the solvent has a boiling point of at least 120° C.

8. The dispersion of claim 1 wherein the solvent is present in the composite dispersion in the range of from 1% to 15% by weight based on the total weight of the dispersion.

9. The dispersion of claim 1 having a pH greater than 2.

10. A film made from the dispersion of claim 1.

11. The film of claim 10 having a conductivity of at least 440 S/cm.

12. An electronic device comprising at least one layer made from the dispersion of claim 1.

13. The device of claim 12, wherein the layer is an anode.

14. The dispersion of claim 1 wherein the at least one polar solvent is selected from the group consisting of ethylene glycol, dimethylsulfoxide, dimethylacetamide, N-methylpyrrolidone, and mixtures thereof, the fullerene is selected from the group consisting of C60, C60-PCBM, C70, C70-PCBM, and mixtures thereof, the carbon nanotube is HIPco CE608, and mixtures of the nanotube and fullerenes.

* * * * *